United States Patent
Kunisch

(10) Patent No.: US 7,260,211 B2
(45) Date of Patent: Aug. 21, 2007

(54) METHOD AND CIRCUIT FOR ADAPTING THE IMPEDANCE OF AN ANALOG TELECOMMUNICATION CONNECTION

(75) Inventor: Paul Kunisch, Puchheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/475,430

(22) PCT Filed: Feb. 27, 2002

(86) PCT No.: PCT/DE02/00715

§ 371 (c)(1),
(2), (4) Date: Apr. 26, 2004

(87) PCT Pub. No.: WO02/087206

PCT Pub. Date: Oct. 31, 2002

(65) Prior Publication Data

US 2004/0208310 A1 Oct. 21, 2004

(30) Foreign Application Priority Data

Apr. 23, 2001 (DE) ............................... 101 19 793

(51) Int. Cl.
*H04M 7/04* (2006.01)
*H04M 9/00* (2006.01)

(52) U.S. Cl. .................................. 379/398; 379/403
(58) Field of Classification Search ................. 379/398
See application file for complete search history.

(56) References Cited

U.S. PATENT DOCUMENTS

| | | | | |
|---|---|---|---|---|
| RE31,182 E | * | 3/1983 | Craiger et al. ............... 370/394 |
| 5,627,501 A | * | 5/1997 | Biran et al. ................. 333/17.1 |
| 5,802,169 A | * | 9/1998 | Frantz et al. ............... 379/398 |
| 5,909,384 A | * | 6/1999 | Tal et al. ..................... 708/322 |
| 6,137,880 A | * | 10/2000 | Bella ...................... 379/399.01 |
| 6,192,109 B1 | * | 2/2001 | Amrany et al. ................ 379/30 |
| 6,223,022 B1 | * | 4/2001 | Birth et al. .................... 455/80 |
| 6,295,343 B1 | * | 9/2001 | Hjartarson et al. ....... 379/93.05 |
| 6,507,199 B1 | * | 1/2003 | Ahrndt et al. ................ 324/533 |
| 6,836,509 B1 | * | 12/2004 | Nordin et al. ............... 375/220 |
| 6,965,670 B1 | * | 11/2005 | Kunisch ................ 379/399.01 |
| 6,990,191 B2 | * | 1/2006 | Anderson et al. ........... 379/398 |

FOREIGN PATENT DOCUMENTS

WO WO99/34588 * 7/1999

* cited by examiner

*Primary Examiner*—Ramnandan Singh
(74) *Attorney, Agent, or Firm*—Morrison & Foerster LLP

(57) ABSTRACT

The invention relates to a method and a circuit for adapting the impedance in a telecommunication connection comprising a speech path and a data path having modems. Conductive properties measured by the modems are used to precisely adjust the impedance on the speech path.

13 Claims, 2 Drawing Sheets

METHOD AND CIRCUIT FOR ADAPTING THE IMPEDANCE OF AN ANALOG TELECOMMUNICATION CONNECTION

CLAIM FOR PRIORITY

This application claims priority to International Application No. PCT/DE02/00715, which was filed Feb. 27, 2002 and published in the German language on Oct. 31, 2002, which claims the benefit of priority to German Application No. 101 19 793.4, which was filed in the German language on Apr. 23, 2001.

TECHNICAL FIELD OF THE INVENTION

The invention relates to a circuit and method for matching the impedance on at least one end of an analog telecommunication connection, and in particular, between a subscriber end and an exchange end, with a speech path and data path for modems being provided at both ends.

BACKGROUND OF THE INVENTION

When establishing a telecommunication connection, it is necessary to match the devices at both ends of an analog telecommunication connection. The devices are matched to each other with regard to their impedances and to the conductive properties of the telecommunication connection itself. This allows, for example, suppression of the formation of a speech echo such that it does not create a disturbance when operating the connection. This matching takes place in a known manner in that for different groups of line impedances, input impedances and balancing impedances a number of splitters and filters were developed that are used according to requirements. Additionally, matching the different conductive properties by reflecting incoming frequencies is also known, with the phase shift and amplitude attenuation being changed to achieve the required matching. With this variation, the property of reflection of frequencies with regard to amplitude attenuation and phase shift can be laid down in a simple manner in a coefficient table so that a variable matching to the different conditions of an analog telecommunication connection is obtained.

For all adjusting variations known according to prior art, it is necessary to calibrate the specific line or to give certain requirements for a specific line and in this way achieve a matching of the impedance of the exchange end. From a personnel point of view, this is very expensive on the one hand and, on the other hand, it is also not sufficiently flexible because by changing the environmental conditions, or also even more frequently changing the connection situation at the subscriber end, which cannot necessarily be influenced from the exchange end, changes in the situation over time result to which the network operator must adapt as quickly as possible.

SUMMARY OF THE INVENTION

The invention relates to a circuit and method for matching the impedance on at least one end of an analog telecommunication connection, and in particular, between a subscriber end and an exchange end, with a speech path and data path for modems being provided at both ends.

The invention also relates to a circuit arrangement of a telecommunication path with a subscriber end and an exchange end with an analog exchange line of a communication network and with a speech path arranged at the subscriber end and the exchange end and with at least one telecommunication terminal at the subscriber end and a data path with at least one modem each, with a device for selecting the frequencies used per path and at least one device for adapting an impedance being provided.

The invention therefore provides a method for impedance matching at least one end of an analog telecommunication connection, that enables a more flexible reaction to the changing conductive properties. To implement this method, a corresponding circuit arrangement of a telecommunication path should also be specified.

In an as yet unpublished patent application of the applicant (99 E 1998 DE/200017270), a method for analysis of a data line between a first and second end with a modem, that is fitted with at least one transmitter/receiver amplifier, at least one memory for data and/or programs, at least one signal processor and one means for spectral analysis of incoming signals, is proposed, with a spectral analysis of the data line being performed at the opposite end with the aid of the modem and conclusions being drawn from the results of the spectral analysis regarding the conductive properties.

Hence, in a training phase between a subscriber end and a modem in the switching center at the exchange different tones and test signals are transmitted and analyzed between this modem. From the measured reception levels and transit times, the attenuation on the analog telecommunication connection at different frequencies and the approximate line length and line impedance are determined. The content of this aforementioned patent application is hereby incorporated by reference with regard to content in the disclosure part of this application, particularly with regard to the method of analysis of the data line.

Because the input impedances of the analog terminals and of the modem at the subscriber end in the frequency range for voice transmission are known with sufficient accuracy, is possible from the line parameters obtained by the modems to determine both the input impedance of the line, including the normally fitted POTs splitter, or of the inline filter respectively, and also the frequency-dependent attenuation distortions. This impedance value can therefore be used in the analog subscriber circuit for the balancing impedance (balancing filter), in order to balance the impedances of the telecommunication connection. In addition, the frequency dependent attenuation distortion can be reduced by modification in a digital filter in the digital signal processor (DSP) used for the speech transmission.

In accordance with the invention, there is an improved method for impedance matching at least one end of an analog telecommunication connection (I) between a subscriber end (I) and an exchange end (III), with a speech path and data path each for modems being provided at both ends, so that with one modem, at least at the establishment of a first connection, the conductive properties of the telecommunication connection with attenuation and impedance is directly or indirectly measured and used for setting the balancing impedance on the speech path.

In another embodiment in accordance with the invention, the information regarding the measured conductive properties be stored in a coefficient table that can be read by the speech path. For example, this can take place by the interchange of a pointer on a specific column of the coefficient table or by reading in a specific mark in the coefficient table.

It is also possible to transfer the information on the measured conductive properties of the data path directly to the speech path, without the intermediate route via the coefficient table having to be taken.

Furthermore, the information on the measured conductive properties can also be transmitted as a definition of a certain coefficient set.

Preferably, the balancing impedance is matched at the exchange end, but it is also possible to match the balancing impedance in a corresponding manner at the subscriber end on the basis of a previous measurement by the modem.

The method explained above thus enables matching to the particular current situation of an analog telecommunication connection to be carried out in a very simple manner.

In accordance with another embodiment of the invention, there is a circuit arrangement of telecommunication path with a subscriber end and exchange end, with an analog exchange line of a communication network, with a speech path arranged at the subscriber end and at the exchange end with at least one telecommunication terminal at the subscriber end and a data path with at least one modem each, with a device for selecting the used frequencies per path and at least one device for matching an impedance being provided, so that the modems have a device for the indirect or direct determination of the conductive properties of the analog exchange line and means for transmission of the information on the measured conductive properties via the speech path are provided.

Because a transmitted signal is in each case generated with an interference signal in the opposite direction in correlation with this, it is also possible to largely actively suppress the incoming signal by means of a signal dependent on the transmitted signal. To do this, a second signal that is phase shifted and matched in amplitude is derived from the transmitted signal and superimposed with the incoming interference signal, so that this is reduced due to the counteracting amplitude.

In still another embodiment of the invention, there is a device for impedance matching with the aid of a controlled digital signal processor (DSP), that, correspondingly controlled, performs active interference signal suppression. This function can also be performed by a DSP already used for other purposes, by integrating a suitable additional software module.

Furthermore, a device for the further transmission of information on the conductive properties via the speech path can have a coefficient table in which the conductive properties can be stored from the data path and then read from the speech path.

On the other hand, the need for transmission of the information and the conductive properties via the speech path can be a pointer for a coefficient table by means of which the values of the coefficient table to be used are defined.

Advantageously, a device for transmission of the information on the conductive properties via the speech path can be a direct data link between the speech path at the exchange end or subscriber end and the data path.

In accordance with another embodiment of the invention, the device for impedance matching can be arranged both at the exchange end and also at the subscriber end.

In particular, the telecommunication path or telecommunication connection can be an xDSL or an ADSL connection.

BRIEF DESCRIPTION OF THE INVENTION

In the following, the invention is explained in more detail with the aid of illustrations by using preferred examples of embodiments.

DETAILED DESCRIPTION OF THE INVENTION

Figure 1:
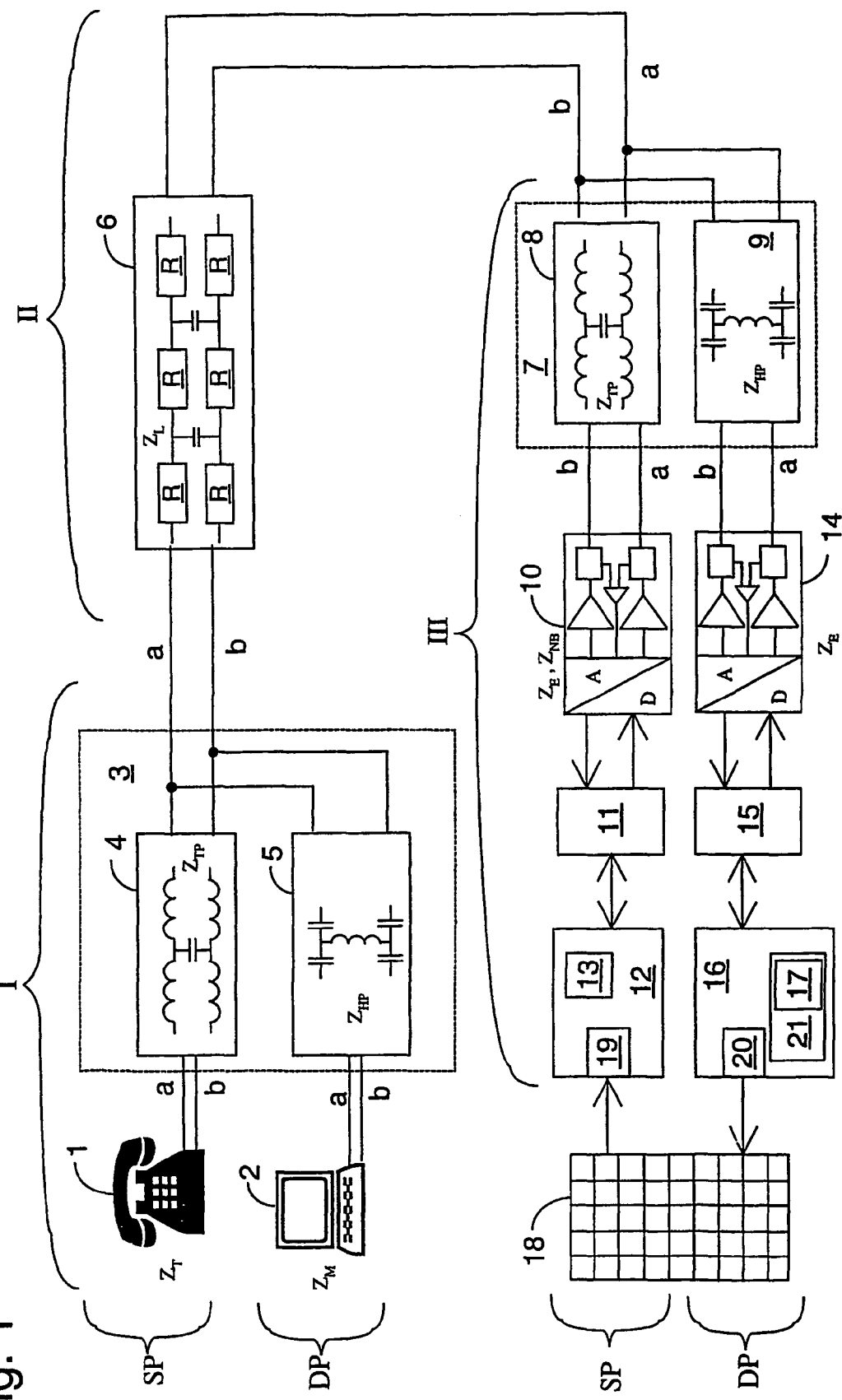
FIG. 1 shows a telecommunication connection with a subscriber end, analog exchange line and analog end with a POTs splitter at the subscriber end and exchange end.

FIG. 1 shows a schematic circuit arrangement of a telecommunication path with a subscriber end I, and an exchange end III and an analog line II between the two ends. The analog exchange line II consists essentially of a known two-wire circuit, the a and b lines, the resistances and capacitances of which are shown in functional block 6. The impedances of the individual functional blocks of the complete circuit arrangement are indicated in each case by Zx.

The subscriber end I includes a low-pass filter 4 and a telecommunication terminal 1 connected after it to form the speech path SP, and connected parallel to this a data path DP with a high-pass filter 5 and the connected modem 2. The low-pass filter 4 transmits the high frequencies and allows only the necessary low frequencies necessary for speech communication through to the telecommunication terminal 1, with the high-pass filter 5 forming a barrier for the low frequencies and allowing the high-frequency signals, containing the data transmitted, to pass to modem 2. Both the high-pass filter 5 and also the low-pass filter 4 are shown in this illustration combined in a POTs splitter 3 as a functional unit.

A speech path SP and data path DP are also present at the exchange end III. In this case also, both paths are separated by a POTs splitter 7 with a high-pass filter 9 and a low-pass filter 8. The low-pass filter 8 in the speech path SP allows the low frequencies to pass to the following line driver 10 with an integrated analog digital converter, from which the digital voice data is exchanged with the connected digital signal processor (DSP) 11, that is again controlled by a control-unit 12.

The data path DP is constructed in the corresponding manner, with a high-pass filter 9, a connected line driver 14 with an integral analog-digital converter that exchanges its data with a DSP 15, that is in turn controlled by the control unit 16.

In accordance with the invention, the control unit 16 is integrated into a modem module 21, that when a connection is established through the data paths DP can determine the conductive properties of the telecommunication path by communication with the modem 2 at the subscriber end. To determine the conductive properties, different frequencies are transmitted and their phase shifts and amplitude attenuations are measured and evaluated in a known manner.

If the conductive properties of the telecommunication path are present, the control unit 16 makes an entry, via the interface 20, in the connected coefficient table 18, with the known line data of the telecommunication path, or a classification of the telecommunication path is marked in the coefficient table 18.

The control unit 12, that has an impedance adjusting module 13, then accesses the coefficient table 18 through the interface 19 and calls up the actual conductive properties of the telecommunication path or at least identifies a classification of the telecommunication path and, on the basis of the information obtained, controls the DSP 11 responsible for the speech path SP so that an optimum matching of the DSP properties to the stated conductive properties of the telecommunication path can be achieved.

Figure 2:
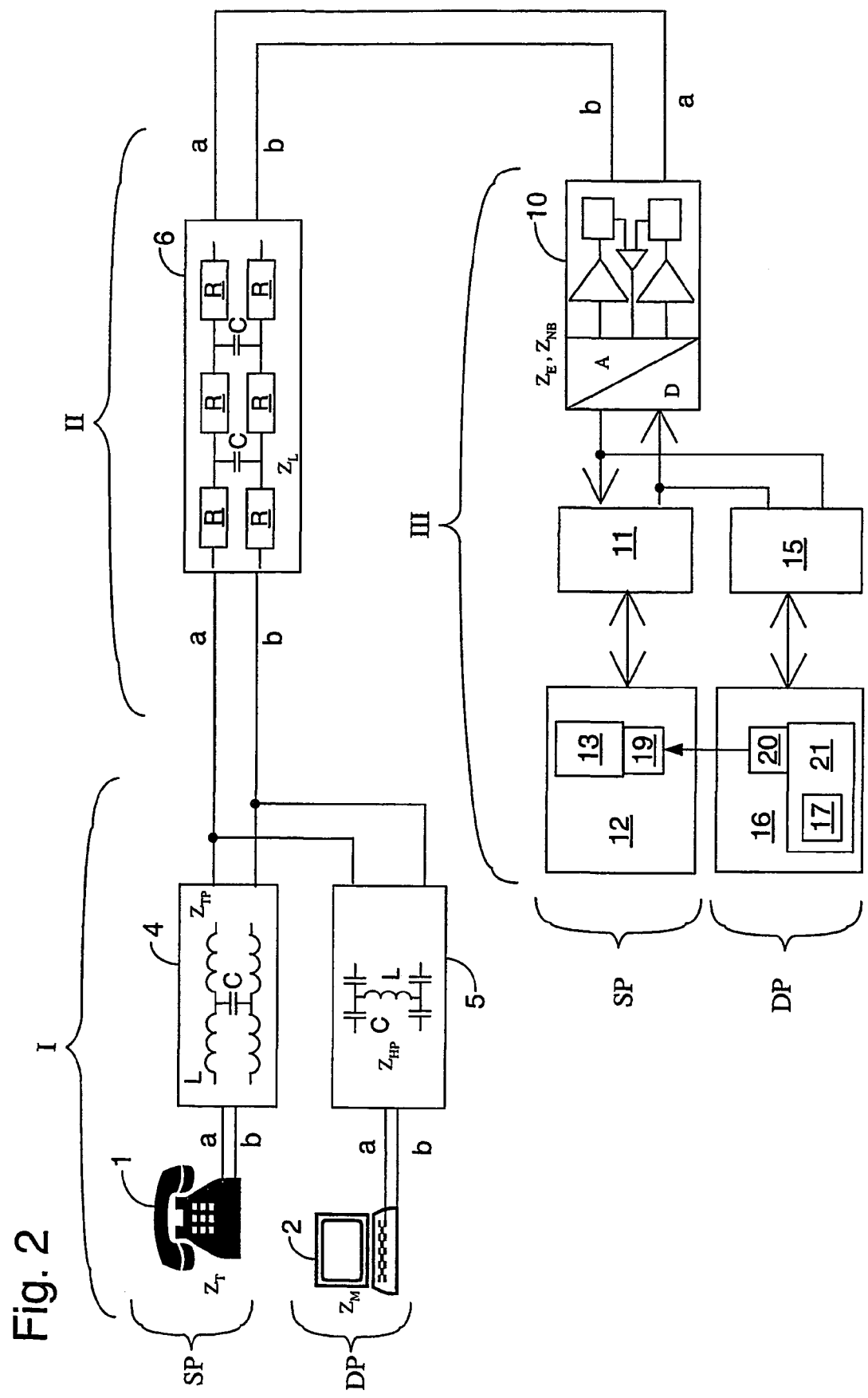
FIG. 2 shows a telecommunication connection with a POTs splitter at the subscriber end, analog exchange line and an exchange end without a POTs splitter.

FIG. 2 shows a similar telecommunication path with a subscriber end I, an analog exchange line II and the exchange end III.

Subscriber end I differs from FIG. 1 only in that the low-pass filter 4 of the speech path SP and the high-pass filter 5 of the data path DP are shown separate, as so-called inline filters. The exchange line II is identical to that shown in FIG. 1.

The exchange end III differs substantially compared with FIG. 1, in that instead of the two line drivers it now has a single broadband power transformer 10 with an integrated analog-digital converter and a separation of the speech path SP and data path DP does not take place until the left of this broadband amplifier 10. The data path DP consists of the DSP 15, controlled via the control unit 16. The speech path SP also has a digital signal processor 11 mirroring this and a control unit 12 that controls it.

Corresponding to the embodiment in FIG. 1, the control unit 16 of the data path DP of the exchange end III has a modem module 21 that can communicate with the modem 2 at the subscriber end and, as described above, can assess the conductive properties of the analog exchange line II by a corresponding test run with the transmission of certain known test signals and, if necessary, also followed by an exchange of the received information with modem 2 at the subscriber end.

In accordance with the invention, the information on the conductive properties of the analog exchange line II is transmitted via the interfaces 20 and 19 directly to an impedance adjusting module 13 of the control unit 12 of the speech path SP, so that this can then control the digital signal processor 11 corresponding to the now known properties of the analog exchange line with all the impedances included therein, and perform an optimum matching to the actual conditions.

It is pointed out that the functional blocks 13, 19, 17, 20, 21 in control unit 12 and 16 connected with the controlled DSPs 11 and 15 need not necessarily be hardware units, but instead are mostly realized as program modules.

The invention also includes measurement of the conductive properties of the telecommunication path, for example manually controlled, can be achieved following a known change in these conductive properties, or that such a measurement of the conductive properties can be automatically carried out each time a connection is established or can also take place at a first establishment of a connection between a subscriber end I and the exchange end III. A time-controlled integration of the conductive properties can, of course, also be integrated.

It is clear that the features of the invention given here can be used not only in the combinations given but also in any other combinations or singly, without departing from the scope of the invention.

In accordance with the invention, for impedance matching in a telecommunication connection with a speech path and data path each with a modem, to use the conductive properties measured by the modem for the correct adjustment of the impedance on the speech path. This means that it is now possible by a more flexible reaction to changing conductive properties to match the impedance at least one end of an analog telecommunication connection.

What is claimed is:

1. A method for impedance matching at at least one end of an analog telecommunication connection between a subscriber end and an exchange end, comprising:

providing a speech path and a data path for modems at both ends; and measuring, via at least one of the modems, the conductive properties of the telecommunication connection with attenuation and impedance at a first establishment of a connection, the measurement used for setting the matching impedance on the speech path such that data disturbance is reduced.

2. The method in accordance with claim 1, wherein the information regarding the measured conductive properties are stored in a coefficient table that can be read from the speech path.

3. The method in accordance with claim 1, wherein the information on the measured conductive properties of the data path is transferred directly to the speech path.

4. The method in accordance with claim 1, wherein the information of the measured conductive properties is transmitted as a definition of a coefficient set.

5. The method in accordance with claim 1, wherein the balancing impedance is matched at the exchange ends.

6. The method in accordance with claim 1, wherein the balancing impedance is matched at the subscriber end.

7. A circuit arrangement of a telecommunication path, comprising:

one subscriber end and one exchange end with an analog exchange line of a communication network;

a speech path allocated to the subscriber end and to the exchange end with at least one subscriber end telecommunication terminal and one data path with at least one modem;

a device to select frequencies used for the paths; and at least one second device for impedance matching based on measurements using modems having a first unit for determination of conductive properties of the analog exchange line and a second unit provided for transmission of the information on the conductive properties via the speech path, such that data disturbance on the data path is reduced.

8. The circuit arrangement in accordance with claim 7, wherein the second unit for transmission of the information on the conductive properties via the speech path has a coefficient table in which the conductive properties are stored by the data path and can be read by the speech path.

9. The circuit arrangement in accordance with claim 7, wherein the second unit for transmission of information on conductive properties via the speech path is a pointer for a coefficient table, by means of which the values of the coefficient table are defined.

10. The circuit arrangement in accordance with claim 7, wherein the second unit for the transmission of information on conductive properties via the speech path is a direct data communication with an interface between the exchange end or subscriber end speech path and a data path.

11. The circuit arrangement in accordance with claim 7, wherein the second device for impedance matching is arranged at the exchange end.

12. The circuit arrangement in accordance with claim 7, wherein the second device for impedance matching is arranged at the subscriber end.

13. The circuit arrangement in accordance with claim 7, wherein the telecommunication path is an xDSL connection.

* * * * *